US012643619B2

(12) United States Patent
Johnson

(10) Patent No.: US 12,643,619 B2
(45) Date of Patent: Jun. 2, 2026

(54) COUPLING SYSTEM AND FIFTH WHEEL SYSTEM

(71) Applicant: SAF-Holland, Inc., Muskegon, MI (US)

(72) Inventor: Marc R. Johnson, Spring Lake, MI (US)

(73) Assignee: SAF-Holland, Inc., Muskegon, MI (US)

( * ) Notice: Subject to any disclaimer, the term of this patent is extended or adjusted under 35 U.S.C. 154(b) by 407 days.

(21) Appl. No.: 18/503,639

(22) Filed: Nov. 7, 2023

(65) Prior Publication Data

US 2025/0145231 A1    May 8, 2025

(51) Int. Cl.
*B62D 53/12* (2006.01)
*B62D 53/08* (2006.01)
*B60D 1/64* (2006.01)

(52) U.S. Cl.
CPC ......... *B62D 53/12* (2013.01); *B62D 53/0885* (2013.01); *B60D 1/64* (2013.01)

(58) Field of Classification Search
CPC ......... B62D 53/08; B62D 53/125; B60D 1/64
See application file for complete search history.

(56) References Cited

U.S. PATENT DOCUMENTS

| 1,973,610 | A | 9/1934 | Connors | |
| 2,480,413 | A | 8/1949 | Kirksey | |
| 2017/0015163 | A1* | 1/2017 | Sielhorst | B60D 1/54 |
| 2021/0053407 | A1* | 2/2021 | Smith | B25J 19/021 |
| 2022/0266943 | A1* | 8/2022 | Lv | B60G 3/14 |

FOREIGN PATENT DOCUMENTS

| CA | 3225377 A1 | 1/2023 |
| DE | 202005019005 U1 | 4/2007 |
| JP | S55145012 A | 11/1980 |

* cited by examiner

*Primary Examiner* — Jayanti K Patel
(74) *Attorney, Agent, or Firm* — Price Heneveld LLP

(57) ABSTRACT

The invention relates to a fifth wheel system including a plate and a coupling system with a guide device, and a coupling arm, wherein the guide device is attached to the plate and defines a guide path which extends essentially elliptical around a central axis, wherein the coupling arm has a first end portion which is slidably arranged along the guide path at the guide device and secured against movements perpendicular to the guide path, wherein the coupling arm extends along a coupling axis and includes a second end portion at which a connector is attached, and wherein the connector is configured to be connected to a mating connecting system of a trailer.

22 Claims, 7 Drawing Sheets

COUPLING SYSTEM AND FIFTH WHEEL SYSTEM

The present invention relates to a fifth wheel system and to a coupling system, in particular for automatic coupling systems.

BACKGROUND

Connecting systems that include connecting electric and pneumatic supply lines of a tractor vehicle to a trailer while tractor and trailer are mechanically coupled to each other by a fifth wheel coupling are generally known in the prior art. In recent years, a special focus has been placed on the development of automated coupling mechanisms and methods that allow the plugs of the tractor and trailer to be connected to each other automatically during a coupling procedure of the trailer and the tractor instead of manually coupling these plugs with each other. To allow automatic coupling of the plugs one of the plug holders must be rotatably installed relative to the tractor or relative to the trailer and has to swing into the correct connecting position before the male plug enters the female plug. Such a rotatable arrangement of one of the plug holders is in particular crucial in cases where the longitudinal axis of the trailer is not aligned with the longitudinal axis of the tractor before or during the final coupling procedure.

One approach to ease the automatic coupling procedure with non-aligned tractor and trailer longitudinal axes is to design the rotation of the plug holder around a common center axis with the king pin. However, this design requires great effort to avoid physical contact between moving parts at the fifth wheel to prevent the plug holder from interference with geometry beneath the fifth wheel. Furthermore, the technical solutions to keep the plug holder in the correct position even during swinging movements of the trailer relative to the tractor about the lateral axis are relatively complicated and require significant maintenance.

It is therefore an object of the present invention to provide a coupling system which eases automatic coupling procedures and results in the stable and reliable positioning of the female and male plug relative to each other even during intensive relative movements of the tractor and the trailer. It is furthermore an object of the present invention to provide a fifth wheel system which can easily be used in automatic coupling procedures.

SUMMARY OF THE PRESENT INVENTION

At least one of the embodiments as shown and described herein provides a fifth wheel system including a plate, a guide device, and a coupling arm, wherein the guide device is attached to the plate and defines a guide path which extends substantially elliptical around a central axis, wherein the coupling arm has a first end portion which is arranged slidable along the guide path at the guide device and secured against movements perpendicular to the guide path, wherein the coupling arm extends along a coupling axis and includes a second end portion at which a connector is attached, wherein the connector is configured to be connected to a mating connecting system of a trailer. According to one key feature of the present invention the guide device is connected or fixed directly to the plate of a fifth wheel coupling. Connecting the guiding device directly to the plate of the fifth wheel resolves issues with pitch and roll and eliminates the need for additional motion compliance that is required for systems that mount to the truck frame. Additionally, the guide device provides a guide path which allows a coupling arm, together with a connector, to move rotationally around the plate of the fifth wheel coupling and thus get positioned in an optimal position for creating a connection to the respective connection system of a trailer. An at least partially elliptical shape of the guide path means that the guide path in one embodiment is extending parallel to the outer rim of a plate of a fifth wheel coupling which might defer from a perfect circular shape. In other words this means that the guide path has along its extension a basically constant distance from the lateral rim or edge of the plate. In this regard, the position of the center of the rotational movement of the coupling arm differs from the position of the central axis as little as possible and preferably only when large deflection of the coupling arm is present. This allows a compromise between a circular rotation around the central axis and the utilization of the available space around the plate of a fifth wheel system.

In an embodiment of the invention the central axis is collinear to a king pin axis defined by a pin receiving section formed at plate. In particular, the central axis equals to the king pin axis of a king pin which is received in the receiving section of the plate. This results in the trailer including the kingpin rotating around the same axis as the coupling arm. This feature eases the coupling of the connecting device installed at the trailer with the connector arranged at the coupling arm In an embodiment of the invention the guide device includes mounting ribs extending towards the central axis wherein an attachment portion is formed at a distal end of each mounting rib, wherein the guide device is positively fixed at the plate via the attachment portions. The mounting ribs serve to position the guide path of the guide device at a certain distance from the lateral edge of the plate. This avoids collisions of the sliding coupling arm with the plate. Furthermore, the mounting ribs allowed to position the guide path of the guide device below a plane which is defined by the upper surface of the plate.

In an embodiment of the invention the mounting ribs are adapted to locate the guide path at a certain distance from an outer rim of the plate. In an embodiment this certain distance varies between 3 cm to 30 cm which in terms of the present invention is regarded to allow for safe movements of the coupling arm relative to the plate without risking collisions. However, in terms of stability of the guide device it is of course desirable to design the mounting ribs as short as possible to reduce the forces and momentums acting on the mounting ribs and their attachment portions.

In an embodiment of the invention the plate includes at an upper side at least one support face defining a plate plane, wherein the guide device is attached to the plate such that it is placed below the plate plane. Positioning the guide device below a plane defined by the upper surface or several upper surfaces of a fifth wheel plate is necessary to avoid collisions between the trailer and the guide device. In a particular embodiment of the invention the distance between the plate plane and the guide device is at least 5 cm and preferably at least 15 cm.

In an embodiment of the invention a major section of the coupling arm is arranged below the plate plane, such that it can move freely below the lower side of a trailer connecting to the fifth wheel system. It is preferred that not only the guide device is arranged below the plate plane but also a major portion, meaning the greater part, of the coupling arm is arranged below the plate plane. By this means is avoided, that the coupling arm collides with the lower surface or attached systems of a trailer.

Another embodiment of the invention describes a coupling system including a guide device, and a coupling arm, wherein the guide device includes at least one attachment portion and a guide rail, wherein the guide rail defines a guide path which extends essentially elliptical around a central axis, wherein the coupling arm has a first end portion which is arranged slidable along the guide path at the guide device and secured against movements perpendicular to the guide path, wherein the coupling arm extends along a coupling axis and includes a second end portion at which a connector is attached, wherein the connector is adapted to be connected to a mating connecting system of a trailer.

In an embodiment of the invention the guide device comprises at least one mounting rib extending from the guide rail towards the central axis, wherein the mounting rib includes at least one attachment portion. As explained before the at least one mounting rib serves to position the guide path of the guide device with a certain distance from the outer rim of a plate. Furthermore, by means of at least one mounting rib the shape of the guide device may differ from the outer shape of a plate at which the guide device is mounted. In particular, the mounting ribs allow to install a circular guide device and an oval plate of a fifth wheel coupling.

In an embodiment of the invention at least one of the attachment portion is a through hole adapted for engaging with a bolt or screw. It is advantageous to design the guide device detachable from a fifth wheel system in particular to allow maintenance of the respective components of the coupling system. Therefore, the attachment portion or the plurality of attachment portions is designed as a through hole through which screws or bolts may pass and engage at a plate of a fifth wheel system to positively fit and connect the guide device at the plate.

In an embodiment of the invention the guide path extends with a constant guide radius around the central axis. In other words, this means that the guide path is circular, which, as described before, allows the coupling arm to rotate synchronized to the rotational movement of a trailer which is intended to be connected to the connector.

In an embodiment of the invention the coupling arm includes a first arm section which incorporates the first end portion, wherein the coupling arm comprises a second arm section which incorporates the second end portion and is attached to the first arm section in such manner that it remains moveable along the connection axis with respect to the first arm section, wherein the connector is attached at the second arm section. In an embodiment of the coupling arm has a two-part design with first arm section, which is attached to the guide device and the second arm section which may move relative to the first arm section along the connection axis, in particular by a telescopic arrangement. This feature allows the connector, attached to the second arm section, to have a greater or lower distance from the central axis in particular to ease the connecting procedure when coupling a trailer with an automatic connecting system.

In an embodiment of the invention the coupling arm includes a coupling spring which is adapted to establish a force between the first arm section and the second arm section to pre-tension the second arm section towards the central axis. Furthermore, in an embodiment of the second arm section is pretensioned towards the central axis by a coupling spring, which provides the respective longitudinal force to bring the connector into an attached and connected position at a mating connecting system arranged at a trailer. The combination of a movable second arm section and a coupling spring furthermore allows to compensate different shapes of different trailer types, which may have an outer geometry with a smaller or larger distance from the respective king pin axis, which equals the central axis when the trailer is connected to the tractor.

In an embodiment of the invention the coupling spring is a coil spring. As in very simple and cheap solution, the coupling spring is designed as coil spring. In case are more sophisticated spring characteristic is required, the coupling spring can also be designed as air spring or can be even combined with a pneumatic system to provide for an actuator, allowing to position the connector at smaller or larger distance from the central axis.

In an embodiment of the invention the coupling arm includes at its first end portion at least one roller, which is adapted to engage at the guide rail and allow the coupling arm to slide along the guide path while preventing movement perpendicular to the guide path. In particular, the coupling arm may slide at the guide rail by help of at least 3, in particular preferred 6 rollers, which secure the coupling arm against all movements relative to the guide rail except the longitudinal movement along the guide path. The use of rollers has the advantage that the friction curing during the sliding movement of the coupling arm is low. Furthermore, the maintenance of the moving parts is cheap and easy to perform because worn rollers can be exchanged with new ones.

In an embodiment of the invention the coupling arm is pivoting at the guide device with a pivoting angle range between 140° and 270°, preferably with a pivoting angle range between 160° and 200°, and in particular preferred with a pivoting angle range of about 180°. The largest pivoting angle range of between 140° and 270° allows to automatically connect trailer supply lines with tractor supply lines at almost any relative angle between the trailer longitudinal axis and the tractor longitudinal axis. However, such arrangement requires a lot of space and it is therefore in particular preferred to keep the pivoting angle within a range of 160" to 200°. This allows the trailer to stand almost orthogonal to the tractor and still be automatically coupled with the supply lines of the tractor. During the coupling process, the coupling arm can be forced by the trailer until it reaches a deflected position in which the angle between the longitudinal axis of the tractor and the coupling axis is about 80° to 100°.

In an embodiment of the invention the coupling system further includes a centering device which pre-tensions the coupling arm towards a neutral position with respect to the guide device. The centering device may in a first embodiment be a spring, in particular preferably a coil spring, which serves to rotate the coupling arm back to neutral position where the coupling axis is parallel to the longitudinal axis of the tractor at which the fifth wheel system with a connecting system according to the invention is arranged. The centering device is at its first distal end connected to a plate of a fifth wheel system or to support structure, fixed to the tractor chassis. At its second distal end, the centering device is connected to the coupling arm and applies a retracting force on the coupling arm when the latter is deflected from its neutral position. In this regard the retracting force increases with increasing deflection.

In an embodiment of the invention the coupling axis cuts the central axis at least in the neutral position. In particular, if the guide path has an elliptical shape, it is preferred that the central axis cuts the coupling axis in at least the state, where the coupling arm is in its neutral position.

In an embodiment of the invention the coupling arm includes an adjuster which is arranged at the second end portion and holds the connector at a position offset from the first end portion perpendicular to the coupling axis. The adjuster may in an embodiment of the invention comprise a plurality of rollers which ease the sliding contact at the trailer outer surfaces to allow a trailer to push the adjuster and thereby the coupling arm into a deflected position and orientation which allows the automatic coupling of the connector to respective connecting device at the trailer. The adjuster is thereby arranged between the connector and the second distal end of the coupling arm. Furthermore, the adjuster allows to position the connector above the second distal end of the connecting arm and above the plate plane.

The invention can relate to the following embodiments:

According to a first embodiment, a fifth wheel system (1) comprises a plate (2), a guide device (4), and a coupling arm (6), wherein the guide device (4) is attached to the plate (2) and defines a guide path (42) which extends essentially elliptical around a central axis (Z), wherein the coupling arm (6) has a first end portion (61) which is arranged slidable along the guide path (42) at the guide device (4) and secured against movements perpendicular to the guide path (42), wherein the coupling arm (6) extends along a coupling axis (C) and comprises a second end portion (62) at which a connector (8) is attached, wherein the connector (8) is adapted to be connected to a mating connecting system of a trailer (20).

According to a second embodiment of the fifth wheel system, based on the first embodiment, the central axis (Z) is collinear to a king pin axis (K) defined by a pin receiving section (24) formed at plate (2).

According to a third embodiment of the fifth wheel system, based on the first or second embodiments, the guide device (4) comprises mounting ribs (43) extending towards the central axis (Z) wherein an attachment portion (44) is formed at a distal end of each mounting rib (43), wherein the guide device (4) is positively fixed at the plate (2) via the attachment portions (44).

According to a fourth embodiment of the fifth wheel system, based on the third embodiment, the mounting ribs (43) are adapted to locate the guide path (42) at a certain distance from an outer rim of the plate (2).

According to a fifth embodiment of the fifth wheel system, based on any of the before-mentioned embodiments one to four, the plate (2) comprises at an upper side at least one support face (22) defining a plate plane (P), wherein the guide device (4) is attached to the plate (2) such that it is placed below the plate plane (P).

According to a sixth embodiment of the fifth wheel system, based on the fifth embodiment, a major section of the coupling arm (6) is arranged below the plate plane (P), such that it can move freely below the lower side of a trailer (20) connecting to the fifth wheel system (1).

According to a first embodiment a coupling system (10) comprises a guide device (4), and a coupling arm (6), wherein the guide device (2) comprises at least one attachment portion (44) and a guide rail (46), wherein the guide rail (46) defines a guide path (42) which extends essentially elliptical around a central axis (Z), wherein the coupling arm (6) has a first end portion (61) which is arranged slidable along the guide path (42) at the guide device (4) and secured against movements perpendicular to the guide path (42), wherein the coupling arm (6) extends along a coupling axis (C) and comprises a second end portion (62) at which a connector (8) is attached, wherein the connector (8) is adapted to be connected to a mating connecting system of a trailer (20).

According to a second embodiment of the coupling system, based on the first embodiment, the guide device (4) comprises at least one mounting rib (43) extending from the guide rail (46) towards the central axis (Z), wherein the mounting rib (43) comprises at least one attachment portion (44).

According to a third embodiment of the coupling system, based on the second embodiment, wherein at least one of the attachment portion (44) is a bore adapted for engaging with a bolt or screw.

According to a fourth embodiment of the coupling system, based on any of the before-mentioned first to third embodiments, the guide path (42) extends with a constant guide radius (R) around the central axis (Z).

According to a fifth embodiment of the coupling system, based on any of the before-mentioned first to fourth embodiments, the coupling arm (6) comprises a first arm section (63) which incorporates the first end portion (61), wherein the coupling arm (6) comprises a second arm section (64) which incorporates the second end portion (62) and is attached to the first arm section (63) in such manner that it remains moveable along the connection axis (C) with respect to the first arm section (63), wherein the connector (8) is attached at the second arm section (64).

According to a sixth embodiment of the coupling system, based on the fifth embodiments, the coupling arm (6) comprises a coupling spring (65) which is adapted to establish a force between the first arm section (63) and the second arm section (64) to pre-tension the second arm section (64) towards the central axis (Z).

According to a seventh embodiment of the coupling system, based on the sixth embodiment, the coupling spring (65) is a coil spring.

According to an eighth embodiment of the coupling system, based on any of the before-mentioned first to seventh embodiments, the coupling arm (6) comprises at its first end portion (61) at least one roller (66), which is adapted to engage at the guide rail (46) and allow the coupling arm (6) to slide along the guide path (42) while preventing movement perpendicular to the guide path (42).

According to a ninth embodiment of the coupling system, based on any of the before-mentioned first to eighth embodiments, the coupling arm (6) is pivoting at the guide device (4) with a pivoting angle range between 140° and 270°, preferably with a pivoting angle range (A) between 160° and 200°, and in particular preferred with a pivoting angle range (A) of about 180°.

According to a tenth embodiment of the coupling system, based on any of the before mentioned first to ninth embodiments, the coupling system further comprises a centering device (67) which pre-tensions the coupling arm (6) towards a neutral position (N) with respect to the guide device (4).

According to an eleventh embodiment of the coupling system, based on the tenth embodiment, the coupling axis (C) cuts the central axis (Z) at least in the neutral position (N).

According to a twelfth embodiment of the coupling system, based on any of the before-mentioned first to eleventh embodiments, the coupling arm (6) comprises an adjuster (68) which is arranged at the second end portion (62) and holds the connector (8) at a position offset from the first end portion (61) perpendicular to the coupling axis (C).

Further advantages and features of the present invention will be apparent from the following description with reference to the Figures. Individual features of the embodiments shown can thereby also be used in other embodiments, unless this has been expressly excluded. These and other aspects, objects, and features of the present invention will be understood and appreciated by those skilled in the art upon studying the following specification, claims, and appended drawings.

DETAILED DESCRIPTION OF PREFERRED EMBODIMENTS

For purposes of description herein, the terms "upper," "lower," "right," "left," "rear," "front," "vertical," "horizontal," and derivatives thereof shall relate to the invention as oriented in FIGS. 1-8. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

Figure 1:
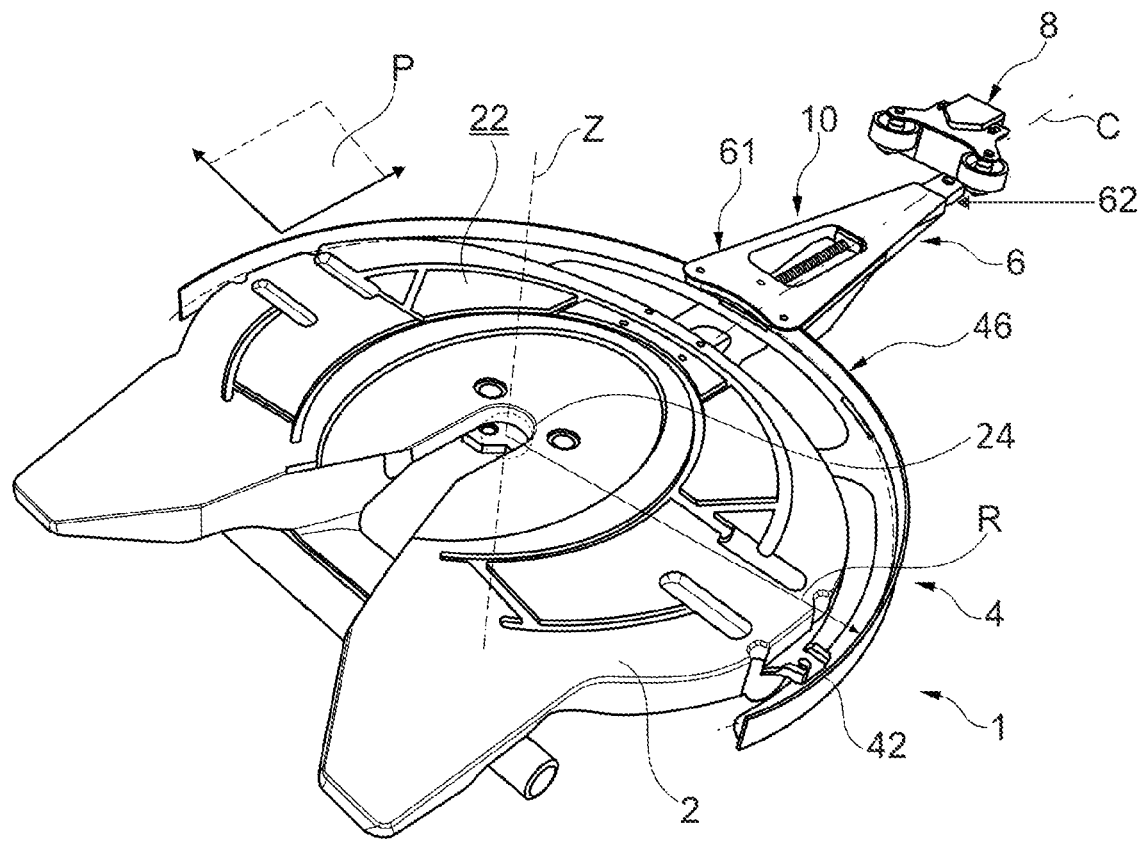
FIG. 1 is a perspective view of an embodiment of the fifth wheel system.
Figure 3:
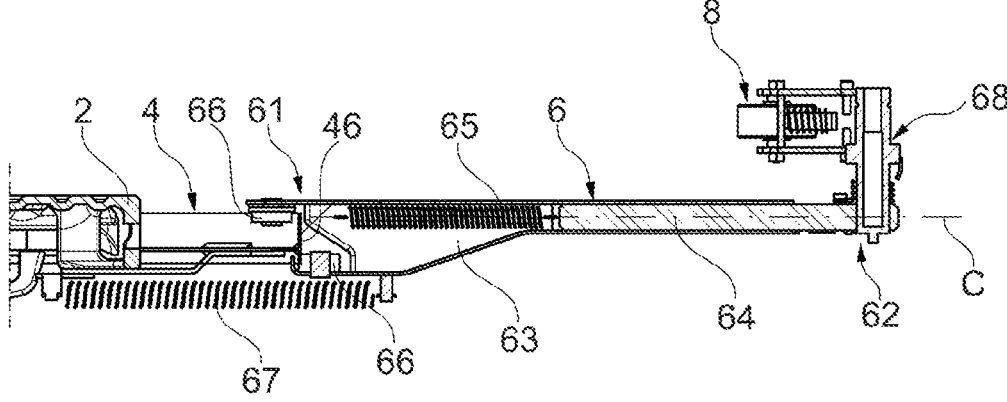
FIG. 3 is a cross sectional side elevation view of the embodiment of FIGS. 1 and 2.
Figure 4:
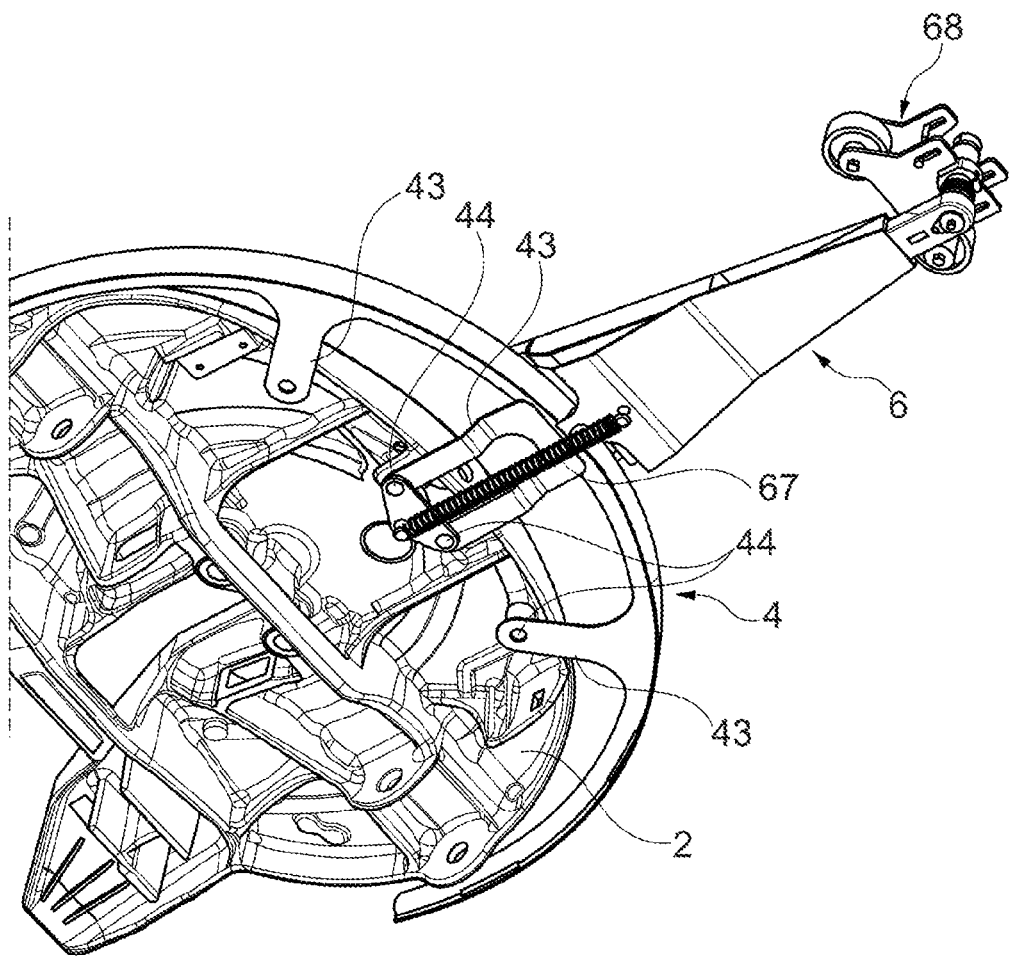
FIG. 4 shows another perspective view of the embodiment of FIGS. 1-3.

FIG. 1 shows a perspective view on an embodiment of a fifth wheel system 1 with a coupling system 10. In the illustrated example, the fifth wheel system 1 includes a plate 2 which is a typical plate of a fifth wheel system known from the prior art and comprises at least one upper support face 22 and a pin receiving section 24. In the embodiment of FIG. 1, a central axis Z lies in the middle of the pin receiving section 24 and is oriented vertically in terms of the orientation of the plate 2 mounted or coupled to a tractor (not shown). Surrounding the outer rim of plate 2 a guide device 4 is attached to the plate 2 in particular with a plurality of mounting ribs 43 (FIG. 4). The guide device 4 includes a guide rail 46 (FIG. 3) which extends along a guide path 42. In the example of FIG. 1, the guide path 42 is circular and has the central axis Z as the center of its circular extension with the constant guide radius R. A coupling arm 6 is slidingly fixed at the guide device 4 in such manner that the coupling arm 6 slides and in the same time rotates around the central axis Z. When a trailer is coupled to the fifth wheel system 1 and the king pin of the trailer is inserted in the pin receiving section 24 the king pin axis is aligned with the axis of rotation of the trailer relative to the tractor and is collinear with the central axis Z. Thus, in the embodiment of FIG. 1, the coupling arm 6 rotates about the same axis as the trailer relative to the plate 2. This feature eases the automatic coupling of the tractor supply lines with the trailer supply lines as will be explained in the following. The support surface 22 or a plurality of support surfaces 22 of the plate 2 define a plate plane P. In particular, the central axis Z is preferably arranged orthogonal to the plate plane P. Another preferred feature of the embodiment is that the guide device 4 and preferably the major part of the coupling arm 6 lies below the plate plane P, which avoids collision of parts of the fifth wheel system 1 which move relative to a trailer. As also shown in FIG. 3, the coupling arm 6 includes a first end section 61 which slidingly couples the coupling arm 6 to the guide rail 46. Furthermore, the coupling arm 6 comprises a second end portion 62 to which a connector 8 is directly or indirectly, i.e. with other parts in between mounted to the coupling arm 6. In the embodiment shown in FIG. 1, a majority of the extension of the coupling arm extends along a coupling axis C where the coupling axis C is collinear to the guide radius R and cuts the central axis Z accordingly. In an alternatively preferred case of an elliptical extension of the guide path 42, the coupling axis C cuts the central axis Z preferably at least in the neutral position similar to as shown in FIG. 1.

Figure 2:
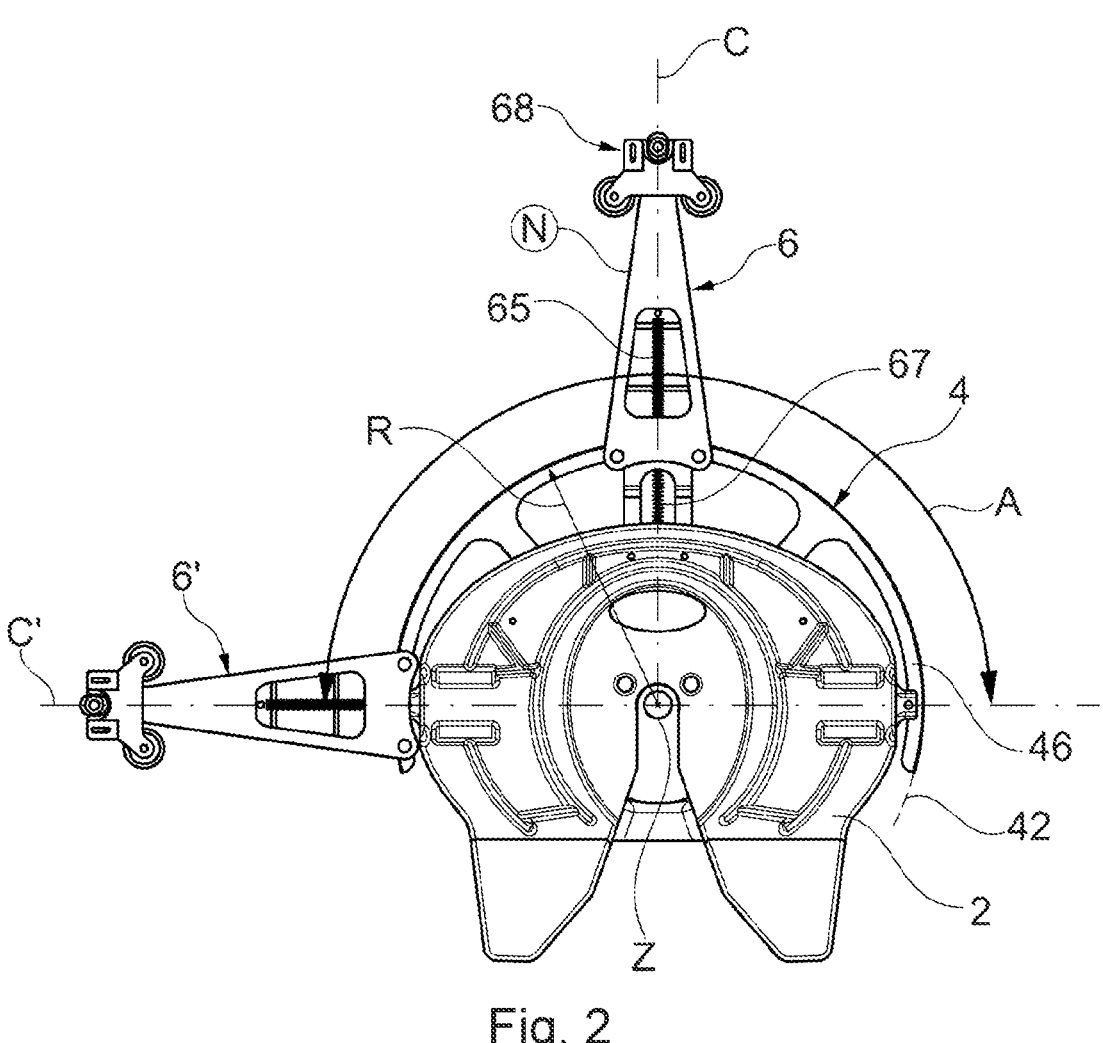
FIG. 2 shows a top plan view on the embodiment of FIG. 1.

FIG. 2 shows a top plan view of the embodiment shown in FIG. 1 where the guide device 4 has a circular extension which is different from the outer shape of the plate 2. As discussed above, in an alternative embodiment the guide path 42 could also have an at least partially elliptical shape which corresponds better to the outer shape of plate 2 and thereby demand less space due to its close proximity to the outer edge of plate 2. In FIG. 2, the coupling arm 6 is shown in a neutral position N. The coupling arm 6' and associated coupling axis C' are shown to the left is in one of the two maximum deflected positions. The pivoting angle range A of this embodiment is accordingly 180°. At the deflected position shown to the left in FIG. 2 the coupling arm 6' is accordingly deflected about 90° counterclockwise from the neutral position N. In an embodiment of the invention, a spring-biased centering device 67 engages at the plate 2 or the guide device 4 and at the coupling arm 6 to return the coupling arm 6 back to its neutral position N as shown in FIG. 2.

FIG. 3 shows the embodiment of FIGS. 1 and 2 in sectional view. As a preferred feature, the coupling arm 6 comprises a first arm portion 63 which comprises the first end portion 61 and is correspondingly mounted on the guide rail 46. In addition, the coupling arm 6 preferably comprises a second arm portion 64 which is telescopically arranged relative to the first arm portion 63 and can move parallel to the coupling axis C relative to the first arm portion 63. A coupling spring 65 is provided to bias the second arm section 64 towards the central axis Z (to the left in FIG. 3) or from an extended position toward a retracted position. It is to be understood that in addition to first and second arm sections 63, 64 the coupling arm could also comprise more arm sections which are movable relative to each other in order to provide high flexibility when coupling to different types of trailers. In the embodiment shown in FIG. 3, an adjuster 68 is mounted on the second end portion 62 of the coupling arm 6 and has a rotatable portion which can rotate about an axis orthogonal to the coupling axis C. This serves to allow the contact rollers of the adjuster 68, together with the connector 8 mounted in the upper portion on the adjuster 68, to rotate together about this orthogonal axis in order to compensate for different orientations of the trailer connection portions and the connector 8 connection portions. The adjuster may further comprise a return spring which biases the adjuster towards a rotational position in which the contact geometry of the connector 8 is substantially parallel to the coupling axis C.

FIG. 4 shows the lower side of an embodiment of the fifth wheel system 1 in a perspective view. The centering device 67, which in this example includes a coil spring, engages at an attachment portion 44 of a central mounting rib 43 of the guide device 4. The attachment portions 44 of the mounting ribs 43 provided at the guide device 4 are formed as bores and are configured to fasten the guide device at the plate 2 with screws or bolts.

Figure 5:
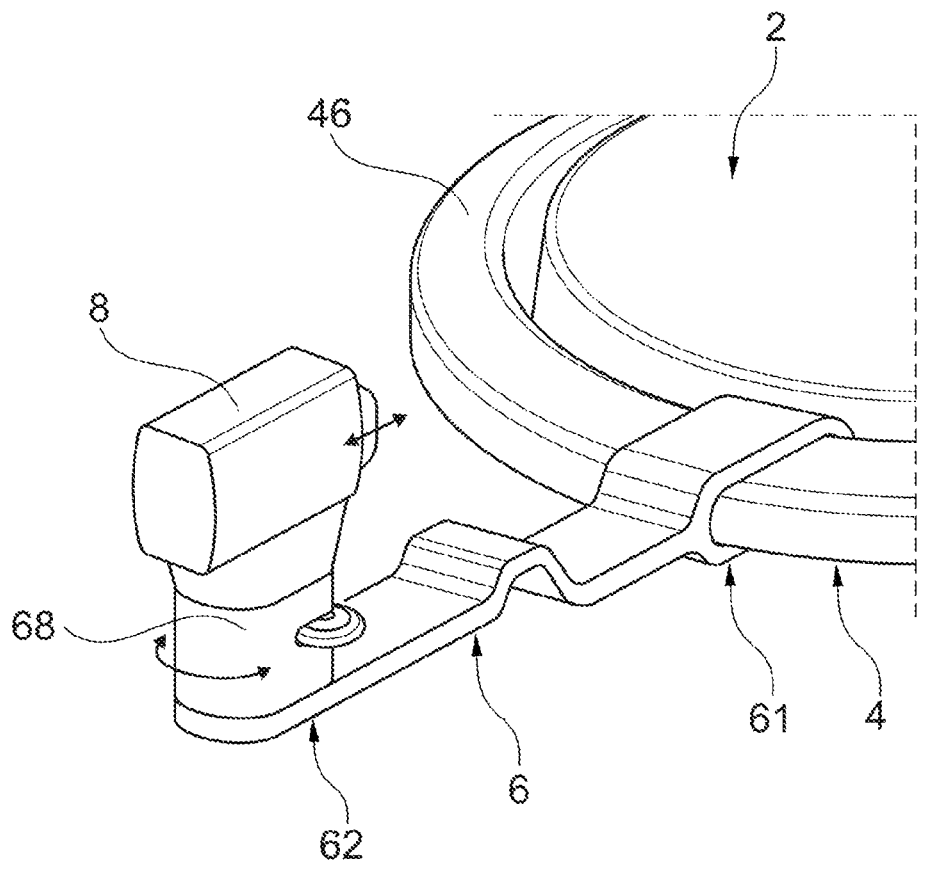
FIG. 5 shows a perspective view of another embodiment of a connecting system.

FIG. 5 shows an embodiment of the coupling system 10 where the guide rail 46 has a disc-shaped cross section, is ring-shaped and is configured to interact with an attachment portion formed at the first end portion 61 of coupling arm 6, which has no rollers. The sliding engagement of the guide arm 6 at the guide device allows for a very simple and therefore cheap solution.

Figure 6:
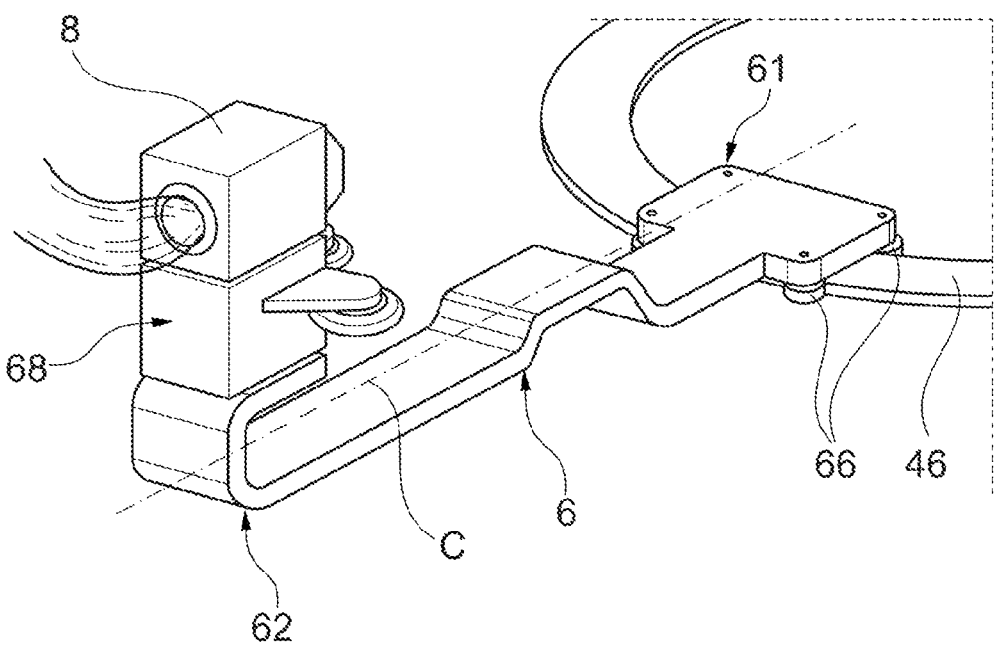
FIG. 6 shows a perspective view of another embodiment of a connecting system.

FIG. 6 shows another embodiment of a coupling system 10, where the guide rail 46 has a basically rectangular cross section and is ring-shaped. In the illustrated example, the first end portion 61 of the coupling arm 6 includes four rollers 66 which engage at the guide rail 46 and allow the coupling arm 6 to slide along the guide path 42. The use of rollers 66 reduces the friction forces and the abrasion processes acting between the coupling arm 6 and the guide rail 46. Furthermore, FIG. 6 shows an embodiment of the connector 8 being mounted on top of the adjuster 68.

Figure 7:
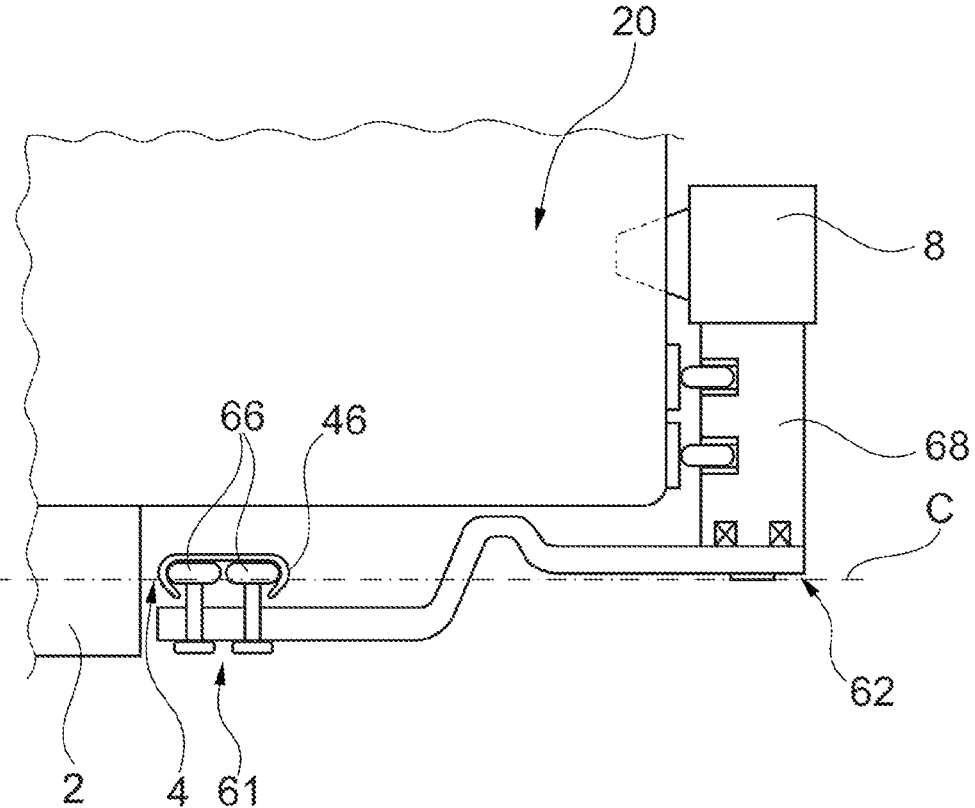
FIG. 7 shows a side elevation view of another embodiment of a connecting system.

FIG. 7 shows a side view of another embodiment of a fifth wheel system 1. The guide rail 46 may have a C-shaped cross section which is adapted to enclose and guide rollers 66 of coupling arm 6. In the illustrated example, the coupling arm 6 is formed as a spring bar which allows balance and dampen movements between the plate 2 and the trailer 20.

Figure 8:
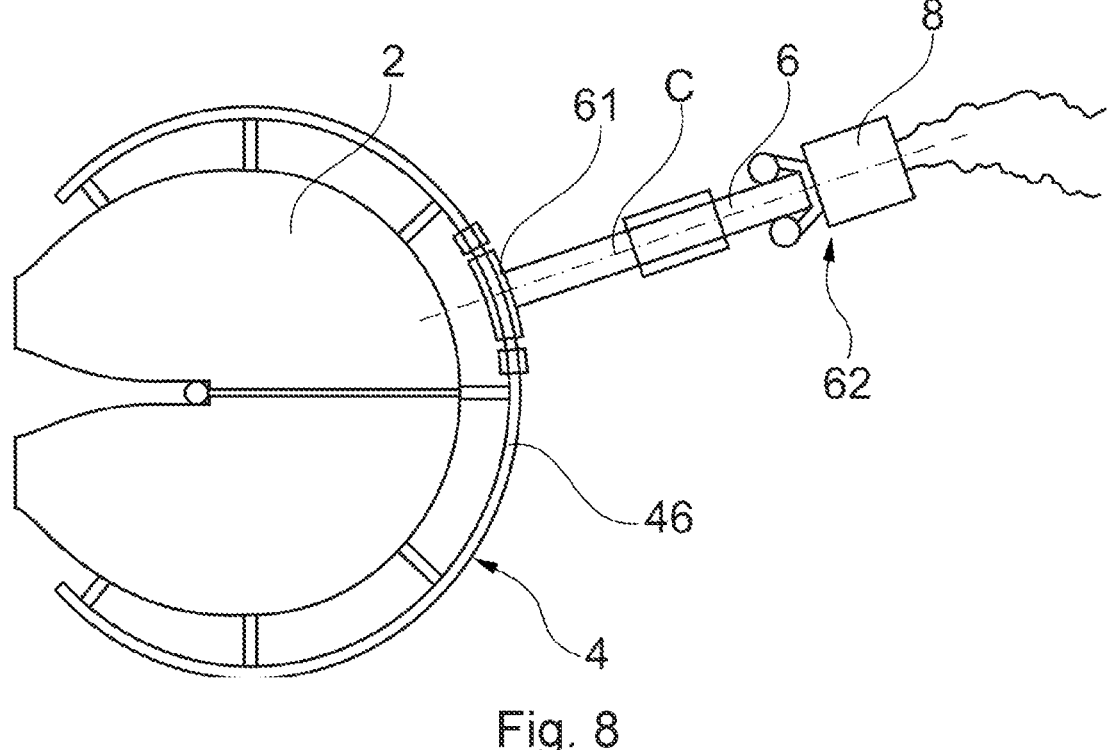
FIG. 8 is a top plan view of another embodiment of a connecting system.

FIG. 8 shows a top view of another embodiment of the fifth wheel system 1. The guide rail 46 in this embodiment defines an elliptical guide path 42 which is adapted to the outer shape of the plate 2, which requires less space than a circular guide path 46. The coupling axis C in this embodiment cuts the central axis only in the neutral position N of the coupling arm and if the coupling arm 6 is deflected about 90°.

Figure 9:
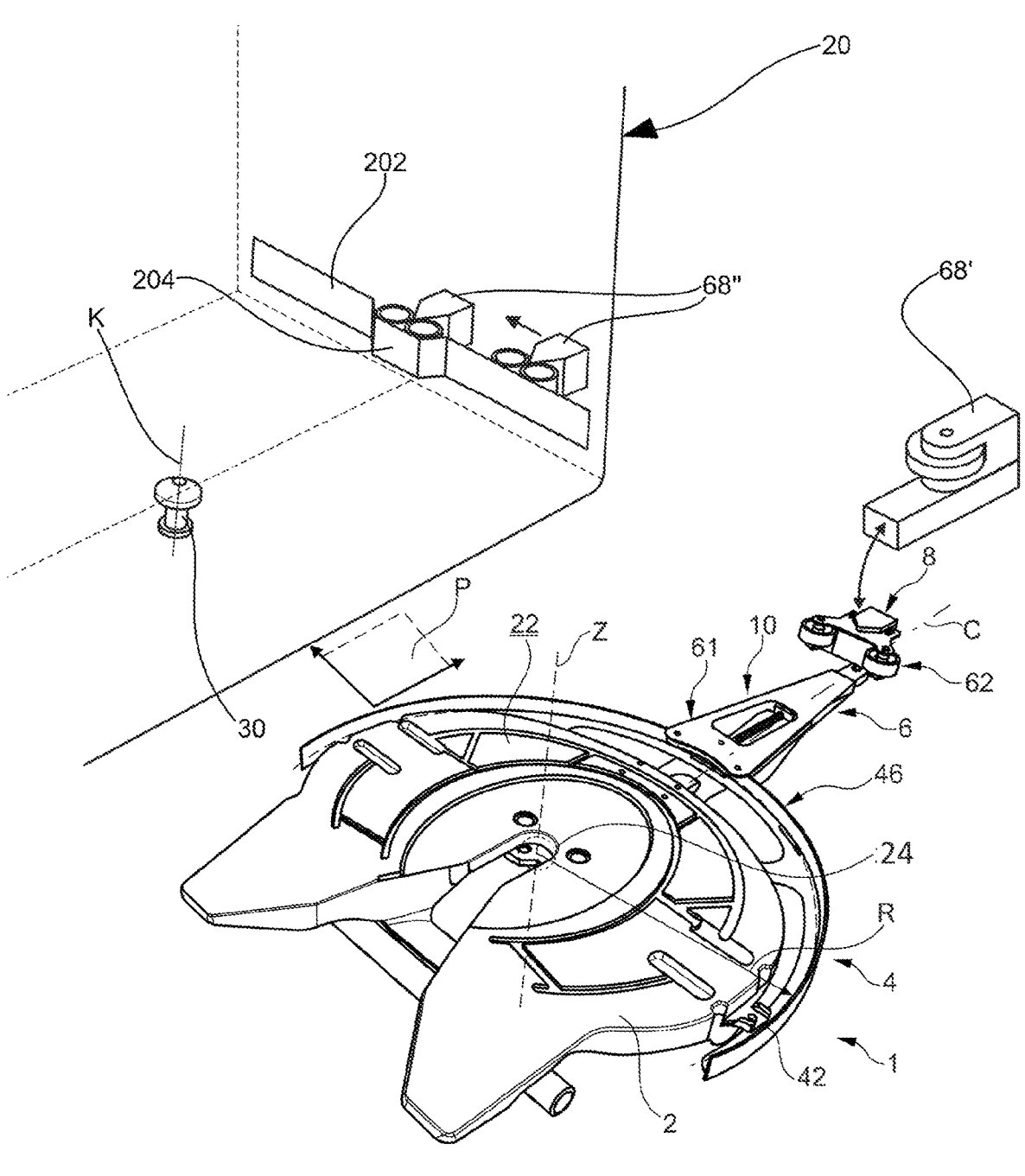
FIG. 9 shows a perspective view of another embodiment of a connecting system.

FIG. 9 shows another embodiment of a fifth wheel system 1, which has many similarities with the embodiment of FIG. 1. Further to the embodiment shown in FIG. 1, a trailer 20 with a king pin 30 is about to be attached to the fifth wheel plate 2. The king pin 30 has a king pin axis K which in the attached state is collinear to the central axis Z. Furthermore, the adjuster 68 of FIG. 1 may have an alternative design 68' that includes only one roller. The trailer 20 may comprise a sliding bar or guide or track 202 mounted at its front surface. A sliding bar 202 allows the adjuster 68, 68', 68" to slide smoothly along the front of trailer 20 until the adjuster 68, 68', 68" reaches the correct position for the connector 8 to be connected to the connecting devices of the trailer 20. To further improve the positioning of the adjuster 68, 68', 68", the sliding bar 202 may comprise a central portion 204 which is formed as local recess into which the adjuster 68, 68', 68" may slide and be held in position until connection between the tractor and the trailer is established. The sliding bar or track 202 thereby reduces wear on the front surface of the trailer 20. The other features shown in FIG. 9 correspond to the embodiment of FIG. 1.

The above description is considered that of the preferred embodiments only. Modifications of the embodiments disclosed herein will occur to those skilled in the art and to those who make or use the disclosed embodiments. Therefore, it is understood that the embodiments shown in the drawings and described above are merely for illustrative purposes and not intended to limit the scope of the invention, which is defined by the following claims as interpreted according to the principles of patent law, including the doctrine of equivalents.

It will be understood that any described processes or steps within described processes may be combined with other disclosed processes or steps to form structures within the scope of the present disclosure.

In the foregoing description, it will be readily appreciated by those skilled in the art that modifications may be made to the described embodiments, processes, or steps without departing from the concepts disclosed herein. Such modifications are to be considered as included in the following claims, unless these claims by their language expressly state otherwise.

REFERENCE NUMERALS

1—Fifth wheel system
2—Plate
22—Support face
24—pin receiving section
4—Guide device
42—Guide path
43—Mounting rib
44—Attachment portion
46—Guide rail
6—Coupling arm
6'—Coupling arm deflected
61—First end portion
62—Second end portion
63—First arm section
64—Second arm section
65—Coupling spring
66—Roller
67—Centering device
68—Adjuster
8—Connector
10—Coupling system
20—Trailer
202—Track
204—central portion
30—King pin
A—Pivoting angle range
C—Coupling axis
K—King pin axis
N—Neutral position
P—Plate plane
R—Guide Radius
Z—Central axis

The invention claimed is:

1. A fifth wheel system, comprising:
a plate;
a guide device attached to the plate and defining a guide path that extends substantially elliptical around a central axis of the plate;
a coupling arm including a first end portion slidable along the guide path of the guide device and secured against movements perpendicular to the guide path, wherein the coupling arm extends along a coupling axis and comprises a second end portion at which a connector is attached, and wherein the connector is configured to be connected to a mating connecting system of a trailer.

2. The fifth wheel system according to claim 1, wherein the central axis is collinear to a king pin axis of a pin receiving section of the plate.

3. The fifth wheel system according to claim 1, wherein the guide device includes mounting ribs extending toward the central axis wherein an attachment portion is located at a distal end of each mounting rib, and wherein the guide device is positively fixed to the plate via the attachment portions.

4. The fifth wheel system according to claim 3, wherein the mounting ribs are configured to locate the guide path at a selected distance from an outer rim of the plate.

5. The fifth wheel system according to claim 1, wherein the plate includes at least one support face on an upper side and defining a plate plane, and wherein the guide device is attached to the plate such that the guide device is located below the plate plane.

6. The fifth wheel system according to claim 5, wherein a section of the coupling arm is arranged below the plate plane such that the coupling arm can move freely below the lower side of a trailer when connecting or connected to the fifth wheel system.

7. A vehicle coupling system, comprising:
a guide device including at least one attachment portion and a guide rail, wherein the guide rail defines a guide path which is configured to extend essentially elliptical around a central axis of a plate; and
a coupling arm including a first end portion slidably arranged along the guide path of the guide device and secured against movements perpendicular to the guide path, wherein the coupling arm extends along a coupling axis, and a second end portion at which a connector is attached where the connector is configured to be connected to a mating connecting system of a trailer.

8. The vehicle coupling system according to claim 7, wherein the guide device further includes at least one mounting rib extending from the guide rail toward the central axis, and wherein the mounting rib includes at least one attachment portion.

9. The vehicle coupling system according to claim 8, wherein at least one of the attachment portion includes a bore configured to engage a bolt or screw.

10. The vehicle coupling system according to claim 7, wherein the guide path extends with a constant guide radius around the central axis.

11. The vehicle coupling system according to claim 7, wherein the coupling arm further includes a first arm section that includes the first end portion, a second arm section that includes the second end portion and that is attached to the first arm section such that the second arm section is moveable along the connection axis with respect to the first arm section, and wherein the connector is attached at the second arm section.

12. The vehicle coupling system according to claim 11, wherein the coupling arm further includes a coupling spring configured to bias the second arm section toward the central axis with respect to the first arm.

13. The vehicle coupling system according to claim 12, wherein the coupling spring includes a coil spring.

14. The vehicle coupling system according to claim 7, wherein the coupling arm further includes at least one roller at the first end portion where the at least one roller is configured to engage the guide rail and allow the coupling arm to slide along the guide path while preventing movement perpendicular to the guide path.

15. The vehicle coupling system according to claim 7, wherein the coupling arm is configured to pivot about the guide device with a pivoting angle range of between 140° and 270°.

16. The vehicle coupling device according to claim 15, wherein the pivoting angle range is between 140° and 270°.

17. The vehicle coupling device according to claim 16, wherein the pivoting angle range is between 160° and 200°.

18. The vehicle coupling system according to claim 17, wherein the pivoting angle range is about 180°.

19. The vehicle coupling system according to claim 7, further comprising:
a centering device which pre-tensions the coupling arm toward a neutral position with respect to the guide device.

20. The vehicle coupling system according to claim 19, wherein the coupling axis cuts the central axis at least in the neutral position.

21. The vehicle coupling system according to claim 7, wherein the coupling arm further Includes an adjuster arranged at the second end portion and that holds the connector at a position offset from the first end portion perpendicular to the coupling axis.

22. A fifth wheel system comprising the vehicle coupling system according to claim 7 and the plate.

* * * * *